No. 801,521. PATENTED OCT. 10, 1905.
J. O. HAAS.
RUNNING GEAR FOR AUTOMOBILES.
APPLICATION FILED OCT. 21, 1904.
4 SHEETS—SHEET 1.
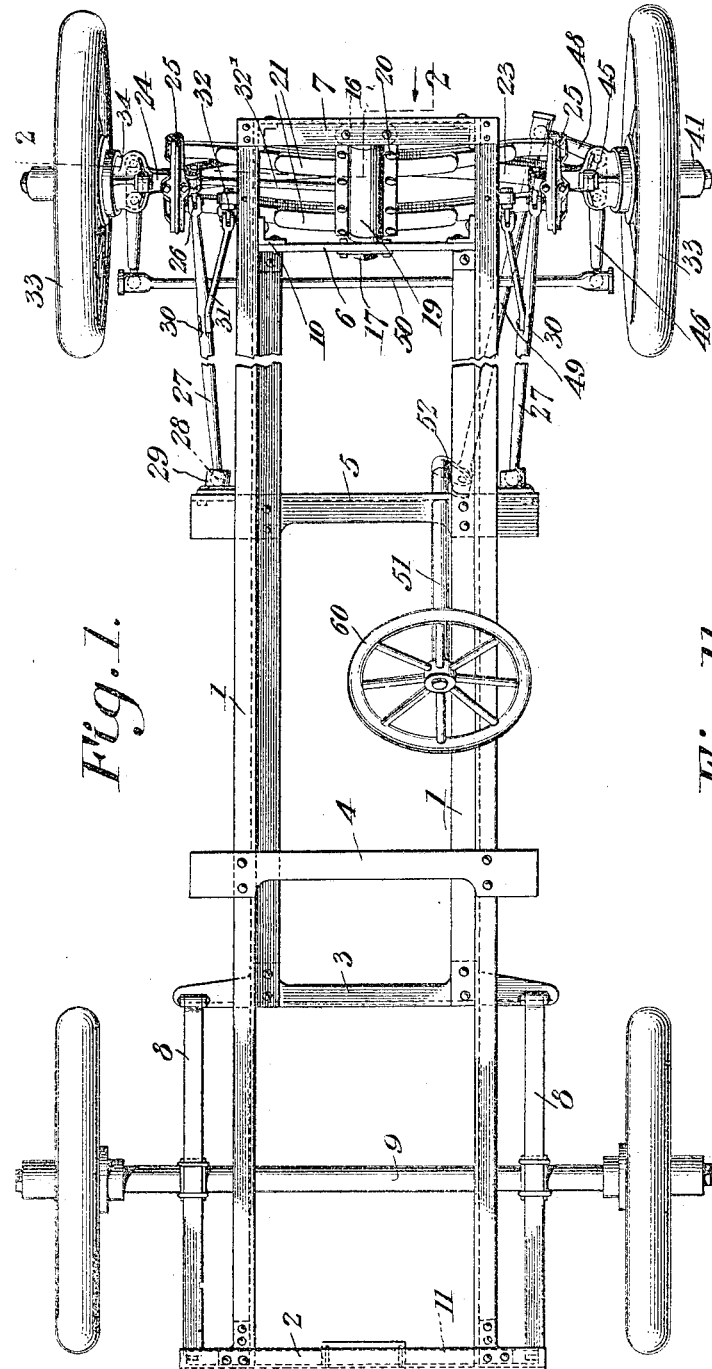
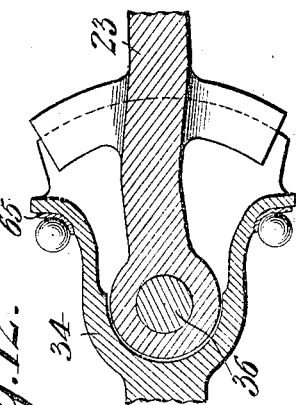
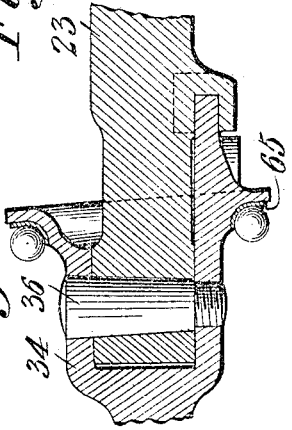
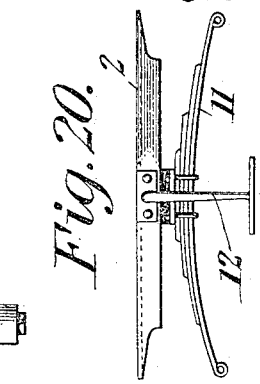
Jackson O. Haas, Inventor.

No. 801,521. PATENTED OCT. 10, 1905.
J. O. HAAS.
RUNNING GEAR FOR AUTOMOBILES.
APPLICATION FILED OCT. 21, 1904.
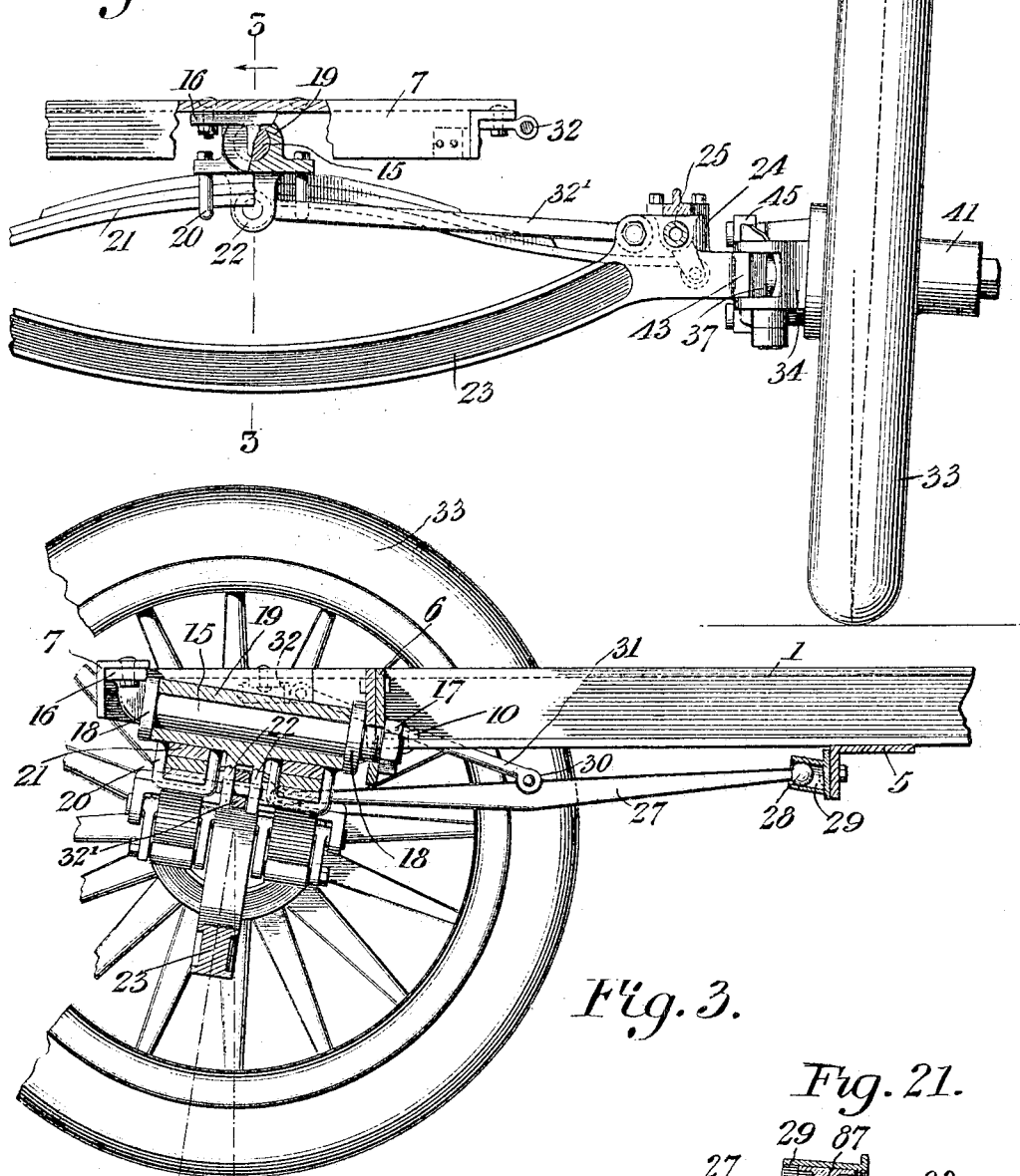
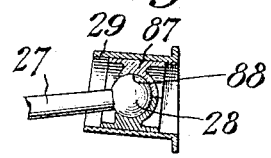
Jackson O. Haas, Inventor.

No. 801,521. PATENTED OCT. 10, 1905.
J. O. HAAS.
RUNNING GEAR FOR AUTOMOBILES.
APPLICATION FILED OCT. 21, 1904.
4 SHEETS—SHEET 3.
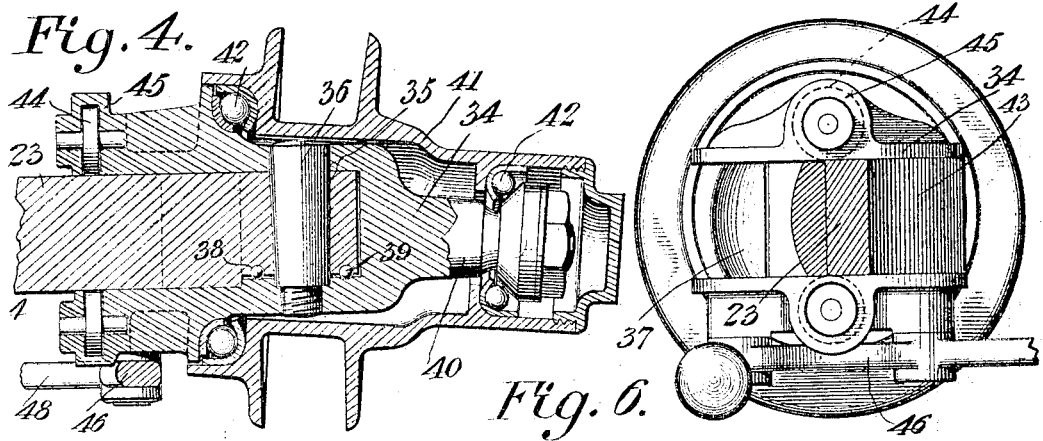
Fig. 4. Fig. 6.
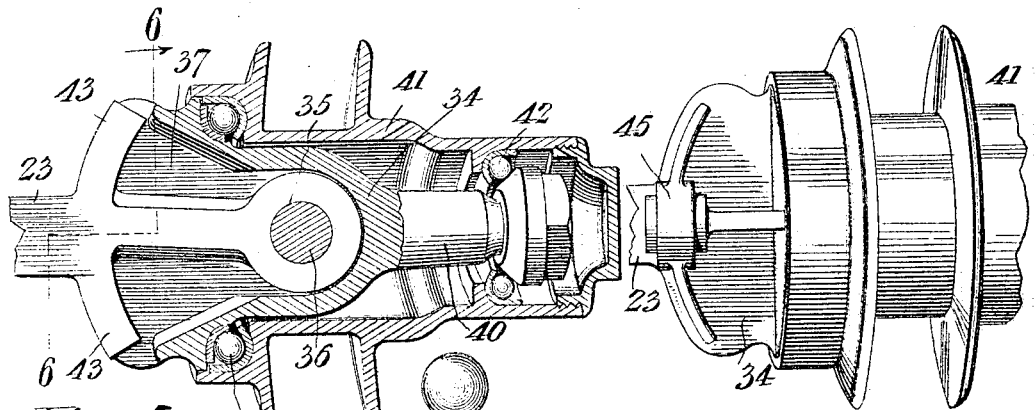
Fig. 5. Fig. 7.
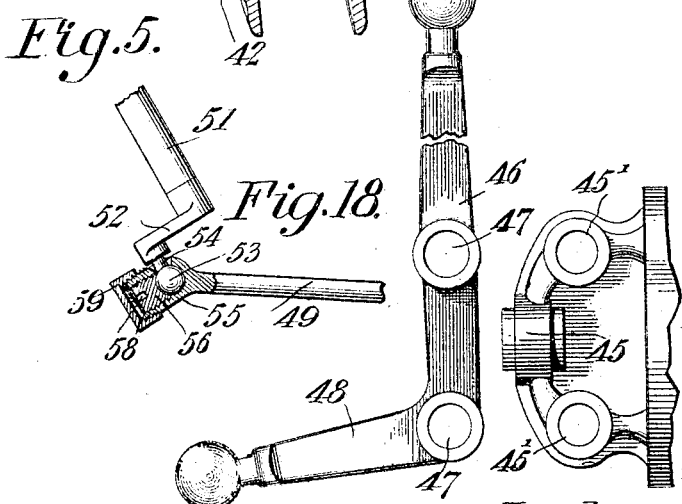
Fig. 18. Fig. 8.
Fig. 19.
Witnesses Jackson O. Haas, Inventor.
by
Attorneys No. 801,521.

PATENTED OCT. 10, 1905.

J. O. HAAS.
RUNNING GEAR FOR AUTOMOBILES.
APPLICATION FILED OCT. 21, 1904.

4 SHEETS—SHEET 4.

Witnesses

Jackson O. Haas, Inventor.

by

Attorneys

UNITED STATES PATENT OFFICE.

JACKSON O. HAAS, OF POTTSVILLE, PENNSYLVANIA.

RUNNING-GEAR FOR AUTOMOBILES.

No. 801,521.

Specification of Letters Patent.

Patented Oct. 10, 1905.

Application filed October 21, 1904. Serial No. 229,481.

*To all whom it may concern:*

Be it known that I, JACKSON O. HAAS, a citizen of the United States, residing at Pottsville, in the county of Schuylkill and State of Pennsylvania, have invented a new and useful Running-Gear for Automobiles, of which the following is a specification.

This invention relates to running-gear for automobiles and motor-vehicles generally; and it has for its object to simplify and improve the construction of the same.

A special object of the invention is to improve the frame construction in order to render the same durable and able to withstand strains and shocks.

Another object is to improve the disposition and construction of the front running-gear to enable the machine to adapt itself to any inequalities in the road and to enable obstructions to be passed without the serious and detrimental shock experienced in many machines of this character.

Another object is to improve the steering mechanism in order to enable sharp corners to be turned easily and gracefully.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 13:
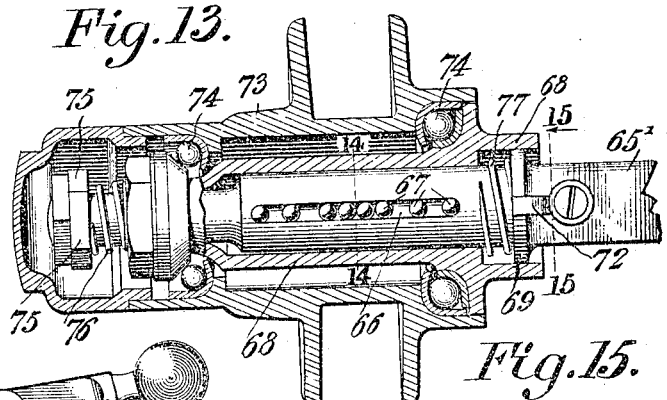
Figure 14:
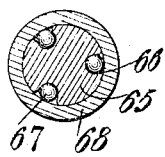
Figure 9:
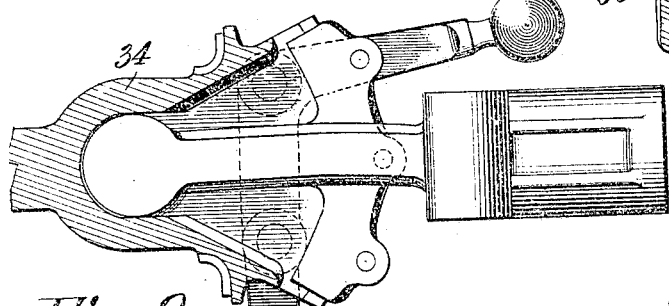
Figure 15:
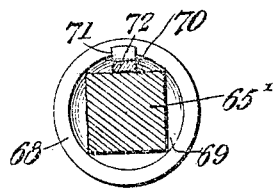
Figure 16:
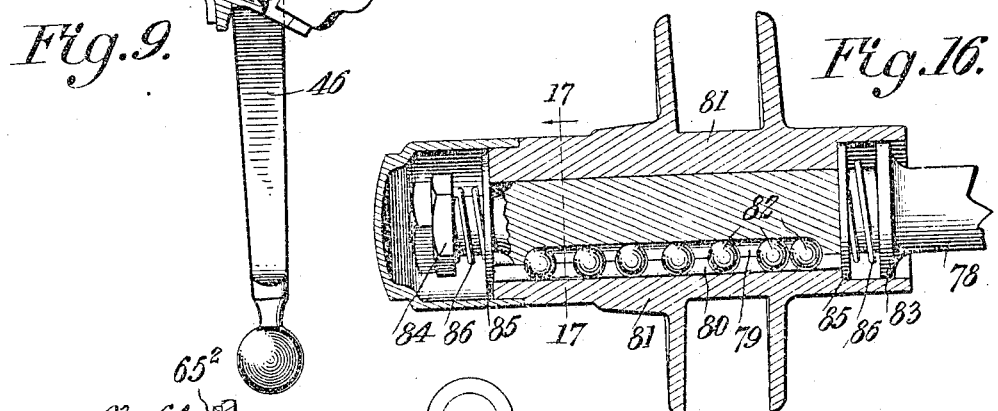
Figure 10:
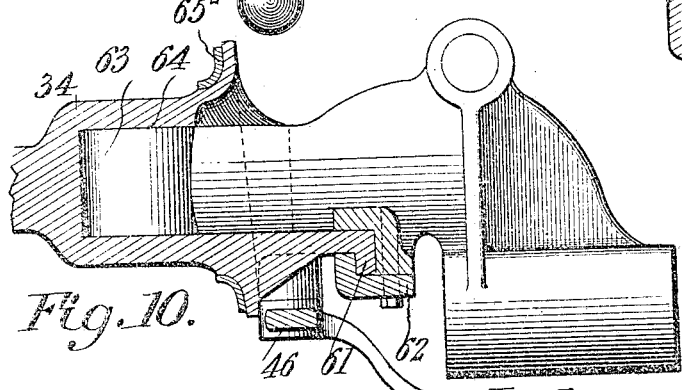
Figure 17:
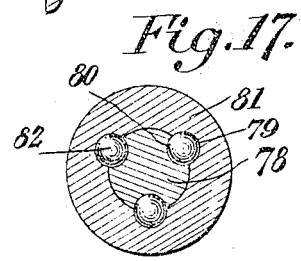

In said drawings, Figure 1 is a top plan view illustrating the frame and running-gear of an automobile constructed in accordance with the principles of the invention. Fig. 2 is a transverse sectional detail view, on an enlarged scale, taken on the line 2 2 in Fig. 1. Fig. 3 is a longitudinal vertical sectional view taken on the line 3 3 in Fig. 2. Fig. 4 is a vertical sectional view taken through the hub and steering-knuckle of one of the front wheels. Fig. 5 is a horizontal sectional view of the same. Fig. 6 is a transverse sectional view taken on the line 6 6 in Fig. 5. Fig. 7 is a top plan view of the steering-knuckle and the inner end of the hub. Fig. 8 is a bottom plan view showing the inner portion of the steering-knuckle and one of the steering-arms, the latter being detached from the knuckle. Figs. 9 and 10 are detail views illustrating certain modifications in the construction of the steering-knuckle. Figs. 11 and 12 are detail views showing a further modification of the knuckle. Fig. 13 is a sectional view showing a portion of a stationary rear axle and a preferred form of hub applied thereto. Fig. 14 is a sectional detail view taken on the line 14 14 in Fig. 13. Fig. 15 is a sectional detail view taken on the line 15 15 in Fig. 13. Fig. 16 is a sectional view illustrating a portion of a live rear axle and a preferred form of hub applied thereto. Fig. 17 is a sectional view taken on the line 17 17 in Fig. 16. Figs. 18 and 19 are detail views illustrating a preferred form of connecting means including a ball-and-socket joint for the steering mechanism. Fig. 20 is a detail rear view of the frame. Fig. 21 is a detail view of a modified form of the cylindrical socket.

Corresponding parts in the several figures are indicated by like characters of reference.

The body of the frame includes two longitudinal members or side bars 1 1, which are preferably constructed of angle-iron of the pattern which is usually known as "Z-iron," said side bars being connected and spaced apart at suitable intervals by cross-bars, which are respectively designated 2, 3, 4, 5, 6, and 7. The cross-bars 2 and 7 are disposed, respectively, at the front and rear ends of the frame. The cross-bars 2 and 3, which latter is suitably spaced from the cross-bar 2, are extended beyond the frame and serve for the attachment of the rear springs 8, to which the rear axle 9 is suitably connected. The cross-bar 5 is located well toward the front and serves to support the steering-gear. The cross-bar 6 is suitably spaced from the front cross-bar 7 and serves, together with the latter, to support the connecting means for the front axle, which will be hereinafter described. The cross-bar 4, which is disposed intermediate the cross-bars 3 and 5, is extended beyond the side bars and is intended in part to support the vehicle-body, which latter does not appear on the drawings. The cross-bars 2 and 5 are likewise extended beyond the sides of the frame; but the cross-bars 6 and 7 do not extend beyond the side bars in order not to interfere with the proper disposal of connecting-bars to be hereinafter described.

The inner horizontal web of the side bars is trimmed off at the front and rear ends of the frame, as clearly seen in Fig. 1, and the cross-bar 6 is connected with the side bars by means of angle-plates 10. The side bars 1 1 are placed comparatively close together to produce a narrow and graceful frame, and the several parts are connected by means of bolts or rivets in any well-known, approved, and durable manner. The rear cross-bar 2 is supported upon a spring 11, the ends of which are suitably connected with the side springs 8, and said rear cross-bar carries a step 12.

The front cross-bars 6 and 7 of the frame serve to support a centrally-disposed longitudinal pin or bolt 15, which is disposed in an inclined or oblique position, its front end being elevated above its rear end, as clearly shown in Fig. 3. Said pin has been shown as being provided at its front end with an upturned lug 16, which is bolted to the under side of the horizontal web of the cross-bar 7, which is an angle-bar. The rear end of the pin 15 extends through an aperture in the cross-bar 6 and is screw-threaded for the reception of a nut 17, whereby said pin is firmly secured. The pin 15 is provided adjacent to the cross-bars 6 and 7 with collars 18, between which is disposed a boxing or housing 19, which is capable of rocking or oscillatory movement upon the pin. This housing is provided on its under side with clips 20 for the reception of the front springs 21, which are leaf-springs of ordinary construction. The housing 19 is also provided intermediate the clips 20 with downwardly-extending lugs 22.

23 designates the front axle, which is of inverted-arch shape and which is provided at the ends thereof with heads or enlargements 24, upon which are mounted the shackles 25, with which the ends of the front springs are connected. Said heads are also provided with oscillatory lugs 26, to which are hingedly connected the front ends of connecting-rods 27, terminating at their rear ends in balls 28, which are slidably fitted in cylindrical sockets 29 upon the ends of the cross-bar 5, which extend beyond the side bars of the frame, as best seen in Fig. 1, attention being called to the fact that the axial line of the cylindrical sockets intersects the hinges of the lugs 32 where the links 31 connect with the longitudinal members 1 1. By this arrangement the rods 27 are capable of an axial movement, as well as an oscillatory and rotary movement, within the socket 29. The rods 27 are provided on their upper sides with lugs 30, which are connected, by means of the links 31, with the oscillatory lugs 32 upon the sides of the frame-bars 1 near the front ends of the latter.

From the construction thus far described it will be seen that the frame has a rocking connection with the front axle through the medium of the pin 15, whereby the front axle is capable of tilting to a certain extent, thereby adapting itself to inequalities and obstructions in the road without straining or torting the frame, which latter remains at all times in an approximately horizontal position. The connecting-rods 27 and links 31 will adapt themselves readily to the movement of the axle. One end of the axle is also connected with the depending lugs 22 of the housing 19 by means of a radius-rod 32', whereby the frame will be maintained properly centered with relation to the axle without danger of lateral displacement under strain to which the parts of the running-gear may be subjected.

The front wheels 33 are mounted upon the steering-knuckles 34, which have pivotal connection with the ends of the front axle. Under the preferred construction, which has been illustrated in Figs. 4 to 8, inclusive, of the drawings, each end of the axle is provided with an eye or aperture 35 for the reception of a pivotal pin 36, upon which the steering-knuckle 34 is pivotally mounted, the inner end of said knuckle being provided with a recess 37 sufficiently wide at its outer end to permit the knuckle to swing upon the pin 36 to the desired extent. The axial line of the pin 36 in the steering-knuckle is inclined forward at the bottom in relation to the forward movement of the vehicle, so that the axial line of said pin strikes the ground ahead of the point of contact of the steering-wheels, but in line with said wheel-tread, as shown in Figs. 2 and 3 of the drawings, where the dotted line $a\ b$ indicates the extended axial line of the pin 36, the purpose of this arrangement being to throw, tilt, or pitch the lower part of said steering-wheels outward in going around curves, thereby reducing strain on the axle and steering-knuckle and rendering steering of the machine much easier. A ball-race 38 may be formed in the under side of the axle concentric with the eye 35 for the accommodation of balls 39 to reduce the friction between the axle and the steering-knuckle. The latter is formed with a spindle 40, upon which the hub 41 is mounted for rotation, antifriction-balls 42 being interposed in the usual manner. The hubs are by preference of the kind which are generally known as "artillery-hubs," and the wheels are dished in such a manner that perpendiculars $a\ c$, drawn centrally through the pivotal pins 35, shall intersect the tires at the points where the latter touch the ground. The wheels will thus be enabled to turn readily under the impulse of the steering mechanism.

The axle 23 is provided at each end with curved lateral extensions 43, concentric with the pivotal pin 36 and serving as tracks for antifriction-rollers 44, which are journaled in suitable recesses or housings 45, formed in the adjacent sides of the steering-knuckle, which latter is thereby enabled to turn freely, the vertical strain being taken up by the said antifriction-rollers.

The inner end of the steering-knuckle, which constitutes the casing containing the recess 37, is provided on the under side thereof with apertures 45' for the reception of bolts or connecting members, whereby it is connected with the steering-arm 46, which is provided with corresponding apertures 47. The steering-arm on the right side of the machine is provided with a laterally-extending arm 48 for connection with a steering-rod 49. A connecting-rod 50 connects the rear ends of the steering-arms 46.

The preferred means for connecting the members of the steering-gear has been illustrated in detail in Figs. 18 and 19 of the drawings, where 51 designates the lower end of the steering-post, having a crank 52, carrying a ball 53, which is connected therewith by a reduced neck portion 54. The steering-rod 49 is provided at the rear end thereof with a socket 55, having a slot 56 to enable the ball 53 to be introduced therein by its reduced neck portion 54. The socket 55 is interiorly threaded for the reception of a plug 57, the inner end of which coöperates with the inner end of the socket to form a bearing for the ball 53, wear upon which may be readily taken up by tightening the plug 57, which is provided in its outer end with a recess 58 for the reception of a wrench. The outer end of the socket 55 is exteriorly threaded for the reception of a cap 59, having a threaded tapering recess, so that by tightening the said cap the outer end of the socket will be compressed upon the plug 57, which latter will thus be securely retained in the position to which it has been adjusted. Similar ball-and-socket joints connect the ends of the steering-rods with the connecting-rod 50 and the laterally-extending arm 48 with the steering-rod 49. The steering-post 51, which is provided at its upper end with a hand-wheel 60, is journaled in the cross-bar 5 of the frame, from which it extends up through the bottom of the vehicle-body. (Not shown.)

In Figs. 9 and 10 has been shown a modified construction of a steering-knuckle whereby the upper portion of the casing, or the portion overhanging the axle, and the pivotal pin 36 are dispensed with, the inner end of the knuckle being in this instance provided with a depending flange 61, which is engaged by a hook-shaped clip 62, connected with the axle upon which the steering-knuckle is thus retained in position in such a manner as to be capable of turning freely upon the head 63 of the axle, which is fitted to the recess 64 in the knuckle.

Still another modification has been illustrated in Figs. 11 and 12. In this, as well as the other modifications of the steering-knuckle, the ball-race 65² is disposed in an inclined position for the purpose of enabling the lower parts of the wheels to be pitched inward, as will be readily understood. In Figs. 5, 9, and 12 the end of the axle has been shown as curved forward for the following reason: When the direction of the travel of the vehicle is changed from a straight-ahead direction to curve, the steering-wheel moving on the inner track or smaller arc must assume a greater angle to the axis than the outer wheel, which moves on the larger of the two concentric arcs. The axle being pivoted in the center of the hub is therefore bent forward to allow the wheel moving on the smaller arc to assume a greater angle.

In Figs. 13 and 14 of the drawings has been illustrated a preferred construction of wheel-hub when applied to a stationary rear axle. In these figures, 65' designates one end of the axle constituting the spindle, which is provided with longitudinal grooves 66, in which are placed balls 67, supporting a longitudinally-movable sleeve 68. The axle is provided with a collar 69, having a notch 70, which is disposed in alinement with a notch or groove 71 in the sleeve 68 for the reception of a key 72, whereby the said sleeve is connected non-revolubly with the axle, but in such a manner as to be capable of sliding axially upon the latter. The sleeve 68 carries the hub 73, between which and the sleeve are interposed the usual antifriction-balls 74. The outer end of the axle carries a nut 75, between which and the outer end of the sleeve is interposed a spring 76. A similar spring 77 is interposed between the inner end of the sleeve and the collar 69. The wheel-carrying sleeve, it will thus be seen, is capable of a sliding movement longitudinally upon the axle, the movement being limited by the nut 75 and the collar 69 and the interposed balance-springs. By this construction the rear wheels are enabled to adjust themselves and to find their own treads instead of being forced to a tread by a rigid hub-bearing, thus reducing the friction and preventing waste of power. Another important advantage resulting from this construction is that the wheels adapting themselves to the treads or tracks will not raise as much dust as will be raised by wheels that are rigid as regards longitudinal movement upon their axles, thus greatly lessening this nuisance.

In Figs. 16 and 17 has been illustrated a modification of the device shown in Figs. 13, 14, and 15, the wheel being in this case applied to a live or rotary axle. The latter, which has here been designated 78, is provided at each end with longitudinal grooves 79, registering with grooves 80 in the hub 81, said grooves being for the reception of antifriction-balls 82, which here perform the double function of facilitating the endwise movement of the hub upon the axle and of keeping the hub against rotation upon the axle. The latter is provided with a collar 83, and it carries at its outer end a nut 84. Washers 85 are interposed between said nut and collar and the ends of the hub, and springs 86 are interposed between said washers and the nut and collar. The washers prevent any possibility of the balls being displaced from the tracks or grooves. By this construction it will be seen that the wheel revolves with the axle, but is capable of longitudinal movement upon the latter in the manner and for the purposes already described.

In Fig. 21 I have shown a preferred form of socket for attachment to the frame of the machine. In this case the socket is fitted with a sliding cross-head 87, having a cylindrical recess 88 for the reception of the ball 28 at the rear end of the connecting-rod 27, said cross-head being split or formed in sections, so that the same may be readily introduced in the socket.

From the foregoing description, taken in connection with the drawings hereto annexed, the operation and advantages of this invention will be readily understood by those skilled in the art to which it appertains. An important advantage of this device resides in the construction of the frame and in the connection of the front axle with the frame by means of the pin 15. By this construction the ends of the front axle are permitted to move freely up and down, and the use of an inner frame is dispensed with, rendering the construction much less cumbersome and complicated. Another extremely important feature of the invention appertains to the forwardly and upwardly tilted front axle and the similarly-tilted pivotal pins, whereby the steering-knuckles are connected with said axle and the peculiar pitch of the dished wheels mounted for rotation upon the steering-knuckles. By this construction the guiding or steering of the vehicle is greatly facilitated, and very sharp corners or curves may be turned without exposing any portion of the steering-gear to any severe or unnatural strain. The frame is capable of being made extremely narrow, giving ample play to the front wheels in guiding the machine around curves, and thus permitting very sharp corners to be turned without inconvenience or excessive strain upon the machine. The general construction is comparatively simple and inexpensive, and the component parts of the device are so proportioned and disposed with relation to each other as to coöperate in the attainment of the best possible results.

Having thus described the invention, what is claimed is—

1. In a device of the class described, a frame structure including longitudinal side bars of Z-iron and cross-bars connecting the same; two of said cross-bars, disposed at and near the rear ends of the structure, being extended beyond the side bars of the latter; in combination with springs connected with the extended ends of said cross-bars, and a rear axle supporting said springs.

2. A vehicle-frame, an axle connected therewith for oscillation in an inclined plane, steering-knuckles connected pivotally with the axle to move in planes approximately at right angles to the plane of oscillation of the axle, and wheels mounted for rotation upon the steering-knuckles, said wheels being dished to contact with the ground at the intersection therewith of the perpendiculars of the centers of the pivots connecting said steering-knuckles with the axle.

3. A vehicle-frame, an axle connected therewith for oscillation in an inclined plane, steering-knuckles connected pivotally with the ends of the axle, and dished wheels mounted for rotation upon the knuckles; the pivots of the latter being so disposed that their extended axial lines will intersect the ground forward of the points of contact of the wheels with the ground.

4. In a motor-vehicle, a frame structure having cross-bars near the front end thereof, an obliquely-disposed bolt supported by said cross-bars, a housing mounted for oscillation upon said bolt, and a front axle connected to said housing.

5. In a motor-vehicle, a frame structure having cross-bars, an obliquely-disposed bolt supported by said cross-bars, a housing mounted for oscillation upon said bolt, and a front axle connected with said housing by intermediate springs.

6. In a motor-vehicle, a frame structure having cross-bars, an obliquely-disposed bolt supported by said cross-bars, a housing mounted for oscillation upon said bolt, said housing having downwardly-extending clips, springs mounted in said clips, and a front axle supporting the springs.

7. In a motor-vehicle, a frame structure having cross-bars, an obliquely-disposed bolt supported by said cross-bars said bolt being provided with annular flanges or collars, a housing mounted for oscillation upon said bolt between the flanges or collars, springs connected with the under side of said housing, and a front axle connected with and supporting said springs.

8. In a motor-vehicle, a frame structure, an obliquely-disposed bolt supported in said frame structure, a housing mounted for oscillation upon said bolt, a front axle, springs supported upon the latter, and connecting means between said springs and the oscillating housing whereby said front axle is tilted forwardly.

9. A frame structure, a longitudinally obliquely disposed bolt supported in said frame structure, a housing mounted for oscillation upon said bolt and having depending lugs, springs connected with the under side of said housing, a front axle supporting said springs, and a rod or brace connecting one end of said axle with the lugs depending from the housing.

10. A vehicle-frame, an axle connected with said frame for oscillation in an inclined plane, and connecting means between said frame and axle including rods connected therewith for oscillation and for longitudinal movement.

11. A vehicle-frame, an axle connected with said frame for oscillation in an inclined plane, and connecting means between said frame and axle including rods connected therewith for oscillation and for longitudinal movement, and links connected with said rods for oscillation and with the frame for oscillation and longitudinal movement.

12. A frame structure including a cross-bar having its ends extending beyond the side bars of said frame structure, a rocking front axle having swivel connection with the frame structure, rods connected hingedly with the axle near the ends of the latter and terminating in balls engaging sockets mounted upon the extending ends of the cross-bar, and links connecting said rods hingedly with the frame structure near the front end of the latter.

13. A frame including a cross-bar having projecting ends, a rocking front axle having swivel connection with an inclined or obliquely-disposed bolt supported by the frame, rods hingedly connected with the axle near the ends of the latter and terminating in balls engaging sockets upon the extending ends of the cross-bar, and links connecting said rods hingedly with lugs upon the side bars of the frame near the front end of the latter.

14. The combination of a frame structure, an obliquely-disposed bolt supported in said frame structure, a housing mounted for oscillation upon said bolt, a front axle connected to said housing and thereby tilted forwardly, knuckles connected pivotally with said axle, steering-arms connected with said knuckles, a rod connecting said steering-arms, and means for manipulating the latter.

15. In a motor-vehicle, a frame including two cross-bars at and near the front end thereof, an inclined bolt supported in said cross-bars, a front axle provided with springs having swivel connection with said bolt, steering-knuckles connected pivotally with the ends of said axle, dished wheels mounted for rotation upon the steering-knuckles, and steering-gear connected with said knuckles.

16. In a motor-vehicle, a frame, an inclined bolt supported in said frame, a front axle having swivel connection with said bolt and provided with eyes at the ends thereof, steering-knuckles provided with recesses for the reception of said eyes, wheels mounted for rotation upon said knuckles, said wheels having their upper portions dished outward, and pivotal connecting-pins extending through the steering-knuckles and the eyes at the ends of the axle, the axial lines of said connecting-pins intersecting the tires at their points of contact with the ground.

In testimony that I claim the foregoing as my own I have hereto affixed my signature in the presence of two witnesses.

JACKSON O. HAAS.

Witnesses:
J. C. RIEGEL,
E. P. LENSCHNER.